(12) United States Patent
Praeauer

(10) Patent No.: US 7,755,862 B2
(45) Date of Patent: Jul. 13, 2010

(54) APPARATUS FOR WRITING A MAGNETIC LAYER

(75) Inventor: Johann Praeauer, St. Johann (AT)

(73) Assignee: SkiData AG, Gartenau (AT)

( * ) Notice: Subject to any disclaimer, the term of this patent is extended or adjusted under 35 U.S.C. 154(b) by 1254 days.

(21) Appl. No.: 11/265,010

(22) Filed: Nov. 2, 2005

(65) Prior Publication Data

US 2006/0098321 A1 May 11, 2006

(30) Foreign Application Priority Data

Nov. 5, 2004 (EP) .................................. 04026344

(51) Int. Cl.
*G11B 15/12* (2006.01)
(52) U.S. Cl. ............................... 360/61; 360/31; 360/60
(58) Field of Classification Search ........................ None
See application file for complete search history.

(56) References Cited

U.S. PATENT DOCUMENTS

| | | | | | |
|---|---|---|---|---|---|
| 5,377,055 | A | * | 12/1994 | Ishii | ............................. 360/59 |
| 5,477,509 | A | * | 12/1995 | Shibuya et al. | ............ 369/13.22 |
| 5,822,141 | A | * | 10/1998 | Chung et al. | ................... 360/46 |
| 5,841,603 | A | * | 11/1998 | Ramalho et al. | ............... 360/68 |
| 6,005,733 | A | * | 12/1999 | Schuelke et al. | ............... 360/67 |
| 6,141,161 | A | * | 10/2000 | Sato et al. | ........................ 360/2 |
| 6,189,791 | B1 | * | 2/2001 | Takita et al. | ................. 235/449 |
| 6,271,978 | B1 | * | 8/2001 | Block et al. | .................... 360/46 |
| 6,285,221 | B1 | * | 9/2001 | Leighton et al. | ............. 327/110 |
| 6,297,921 | B1 | * | 10/2001 | Price et al. | ...................... 360/68 |
| 6,466,386 | B1 | * | 10/2002 | Dakroub | ....................... 360/46 |
| 6,496,330 | B1 | * | 12/2002 | Crue et al. | ............. 360/123.38 |
| 6,670,057 | B2 | * | 12/2003 | Inomata | ...................... 428/827 |
| 6,671,113 | B2 | * | 12/2003 | Klaassen et al. | .............. 360/46 |
| 6,882,488 | B1 | * | 4/2005 | Albrecht et al. | ................ 360/55 |
| 7,126,776 | B1 | * | 10/2006 | Warren et al. | .................. 360/51 |
| 7,327,528 | B2 | * | 2/2008 | Inomata | ........................ 360/55 |
| 2002/0167059 | A1 | * | 11/2002 | Nishimura et al. | ........... 257/421 |
| 2003/0030935 | A1 | * | 2/2003 | Yamamoto | .................... 360/67 |
| 2003/0151839 | A1 | * | 8/2003 | Ikuma et al. | ................... 360/46 |

OTHER PUBLICATIONS

European Search Report dated Apr. 12, 2005.

* cited by examiner

*Primary Examiner*—Dismery E Mercedes
(74) *Attorney, Agent, or Firm*—Flynn, Thiel, Boutell & Tanis, P.C.

(57) ABSTRACT

An apparatus for writing a magnetic layer writable with either low or high coercive field strength includes a magnetic head having a magnet coil and a voltage source. The apparatus includes switches between the voltage source and opposing ends of the magnet coil. Two further switches serve to maintain the direction of current flow through the magnet coil. A current measuring device determines the current intensity through the magnet coil. The current measuring device drives the switches in such a way that the current intensity in the magnet coil does not exceed or undershoot a level required for writing the magnetic layer.

17 Claims, 2 Drawing Sheets

APPARATUS FOR WRITING A MAGNETIC LAYER

This invention relates to an apparatus for writing a magnetic layer writable with either low or high coercive field strength with a magnet coil according to the preamble of claim 1.

For recording data with a magnetic head, for example on the magnetic strip of a magnetic card or similar data carrier, magnetic layers are used whose magnetic dipoles have low coercive field strength (="low coercivity" or "LoCo") or high coercive field strength (="high coercivity" or "HiCo") for orientation. While LoCo material has a coercive field strength in the range of 300 oersteds, HiCo material normally has a coercive field strength between 2,000 and 5,000 oersteds. Although the complexity of the equipment is lower for LoCo magnetic layers than for HiCo magnetic layers due to the weaker magnetic field of the magnetic head, LoCo magnetic layers have the disadvantage that recorded data can be erased more easily for example by permanent magnets in the surroundings, e.g. in magnetic locks, headphones or the like.

Magnetic heads are commercially available that can write both LoCo and HiCo magnetic layers, depending on whether the particular operator using the magnetic cards prefers LoCo or HiCo magnetic layers. For writing the LoCo magnetic layer the magnet coil is energized with a low current intensity of about 200 mA for example, but for HiCo magnetic layers with a higher current intensity of e.g. about 20 mA. The specified current intensities must be essentially observed since not only a lower, but also a higher, current intensity can lead to insufficient orientation of the magnetic dipole particles.

The magnetic layer is written with bits in binary coding. Changing the direction in which current flows through the magnet coil of the magnetic head causes the magnetic dipole particles in the magnetic layer to be oriented in one or the other direction in the individual bit locations. A high write velocity requires an accordingly fast change of direction of current. In known magnetic heads with a linearly regulated constant current source, the magnet coil is therefore connected to a comparatively high supply voltage of e.g. 24 V via a resistor or similar current-limiting element. This leads to high dissipation power and thus high heat buildup. Moreover, considerable electronic effort is required for the current reversal.

Besides additional measures for cooling, the known magnetic head necessitates because of the high heat buildup the use of large robust components requiring corresponding space. This involves not only electronic effort but also considerable costs. Also, changes must be carried out on the hardware for example through different resistances when a change is made between LoCo and HiCo material in the known magnetic head.

The problem of the invention is therefore to provide an economical apparatus with low space requirements for writing LoCo and HiCo magnetic layers with a single magnetic head without having to carry out changes on the hardware when a change is made from LoCo to HiCo material, or vice versa, or another magnetic head with accordingly different drive requirements is to be used. Further, the magnetic heads are to be demagnetized by gradually lowering the magnetic write current.

This is achieved according to the invention by the apparatus characterized in claim 1. Advantageous embodiments of the invention are rendered in the subclaims.

The inventive apparatus has at least one switch between the voltage source and the magnet coil of the magnetic head. Further, a device is provided for retaining the direction of current flow through the magnet coil when the switch between the voltage source and the magnet coil is switched off. A measuring device is used to measure the current intensity in the magnet coil. At the same time, the current measuring device drives the switch between the voltage source and the magnet coil, this being done in such a way that when a bit is recorded the switch is switched off after the current intensity required for writing the magnetic layer writable with low coercive field strength or high coercive field strength is reached in the magnet coil. The switch is then switched on and off cyclically such that the current intensity in the magnet coil does not exceed or undershoot the level required for writing.

The invention is based on the consideration, among others, that when the magnet coil is energized, energy is stored in the magnet coil that is reduced after the voltage source is switched off. That is, when the current intensity required for writing is reached, the voltage source can be switched off until the current intensity reaches the given lower limit required for writing the magnetic layer.

After the voltage source is switched off, the switch is switched on again when the current intensity measured by the measuring device reaches the given lower limit required for writing the magnetic layer, or an adjustable fixed time, which is dependent on the type of magnetic tape (LoCo or HiCo) and the magnetic head inductance, has expired. Thus, a switched current source is formed according to the invention.

The device that makes sure the current retains the given current direction after the switch is switched off can be for example a rectifier, e.g. a diode or a transistor, or a switch that is connected to ground and thus maintains the current direction via the magnet coil connected to ground. The switch is switched on synchronously when the switch between the voltage source and the magnet coil is switched off. Obviously, electronic switches are preferably used according to the invention.

For the current measuring device, a low resistor of for example less than 2 ohms is provided in a line that is connected to the magnet coil, on the one hand, and to ground, on the other hand.

In contrast to the linearly regulated constant current source, the inventive apparatus thus does without a high resistor or similar current-limiting element between the voltage source and the magnet coil that leads to high dissipation power, that is, a high heat buildup. The inventive apparatus can thus be built up from economical small components and therefore takes up little space. Also, the current measuring device can be used to adjust the current intensity in the magnet coil, for example to about 20 mA or 200 mA, whereby any other application of current is of course also possible without changes having to be carried out on the hardware. This further provides the advantage that it is possible to use magnetic heads from another manufacturer without hardware changes.

After a write operation there is a residual remanence in the magnetic head which would destroy other tickets. For this reason it is necessary with some magnetic heads, depending on the material used, to perform a defined demagnetization. This can likewise be easily done with the present circuit or adapted to the requirements of a magnetic head from another manufacturer without hardware changes.

Moreover, a simple serial interface comprising few, for example only four, lines can be used between the inventive switched current source and the processor for driving for example the transport device for the magnetic card and other devices of the apparatus for writing the magnetic layer.

High write velocity depends on the current intensity required for writing the magnetic layer being quickly reachable as soon as the switch between the voltage source and the magnet coil is closed for writing a bit. This presupposes a voltage source with an appropriately high voltage. A voltage source with a high voltage of for example 12 V to 26 V or more can readily be used here according to the invention.

At the individual bit locations of the binary coded magnetic layer, the magnetic dipoles are oriented in either one or the other direction, depending on the direction in which current flows in the magnet coil. For current reversal, a first switch is preferably provided according to the invention between the voltage source and the one, first end of the magnet coil, and a second switch between the other, second end of the magnet coil, whereby during the writing of a bit the one switch remains switched off while the other switch is switched on and off, controlled by the measuring device, for measuring the current in the magnet coil. For writing the next bit with oppositely oriented magnetic dipoles, the current direction in the magnet coil is reversed, i.e. during the writing of the next bit the other switch remains switched off while the one switch is switched on and off, controlled by the measuring device. When a switch is spoken of in connection with the invention, electronic switches are of course primarily meant.

The invention will hereinafter be explained in more detail by way of example with reference to the drawing, in which:

FIG. 1 schematically shows a magnetic head when writing a magnetic layer;

Figure 1:
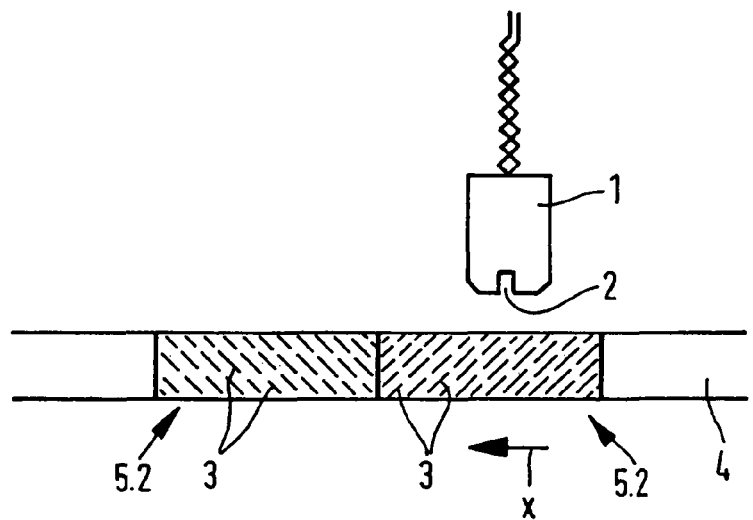

According to FIG. 1, the magnetic head 1 has an air-gap 2 of small width for the magnetic field lines to exit and orient the magnetic dipoles 3 in the magnetic layer 4 either in one direction according to the bit 5.1 or in the other according to the bit 5.2.

For the dipoles 3 to be oriented or changed, a certain magnetic field strength greater than the coercive field strength must be exerted on them, which is e.g. 300 Oe for a LoCo magnetic layer 3, and e.g. 3,000 Oe for a HiCo magnetic layer 3. That is, the magnet coil in the magnetic head 1 must be energized with a low current intensity of for example 20 mA for a LoCo magnetic layer, and a higher current intensity of e.g. 200 mA for a HiCo magnetic layer. To orient the dipoles 3 in one direction e.g. for the bit 5.1, current flows through the magnet coil in the magnetic head 1 in one direction, and to orient the dipoles 3 in the other direction for the bit 5.2 the current direction is reversed.

Figure 2:
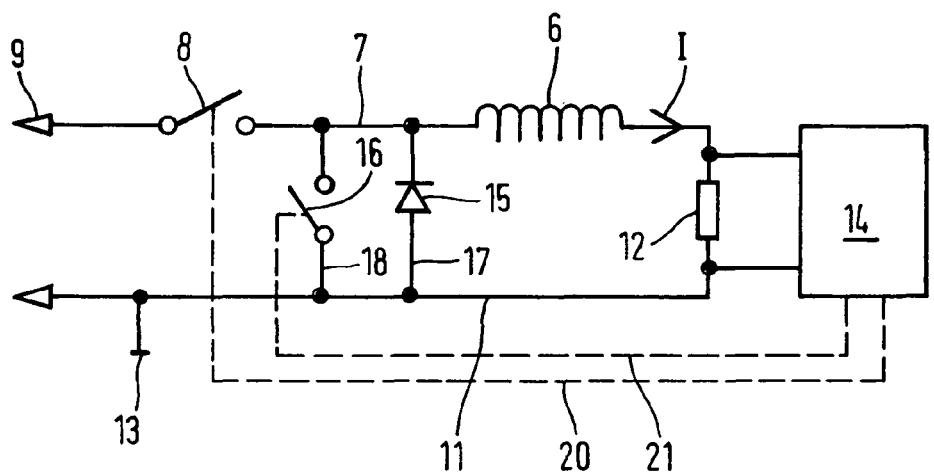
FIG. 2 shows a part of a circuit according to a first embodiment.

In the circuit according to FIG. 2, the magnet coil 6 in the magnetic head 1 is connected at one end via a line 7 with a switch 8 to a voltage source 9 of for example 12 V or 24 V. The other end of the magnet coil 6 is connected to ground at 13 via a line 11 and a resistor 12 of less than 2 ohms.

A current measuring device 14 for measuring the current intensity in the coil 6 is used to tap the voltage drop on both sides of the resistor 12.

So that the current in the coil 6 continues to flow in the same direction after the switch 8 is switched off, a rectifier 15, e.g. a diode, or a further switch 16 can be connected to the line 7 between the switch 8 and the coil 6, and connected to ground at 17 and 18, respectively.

As shown by the dashed lines 20, 21, the switches 8 and 16 are driven by the current measuring device 14.

Figure 3:
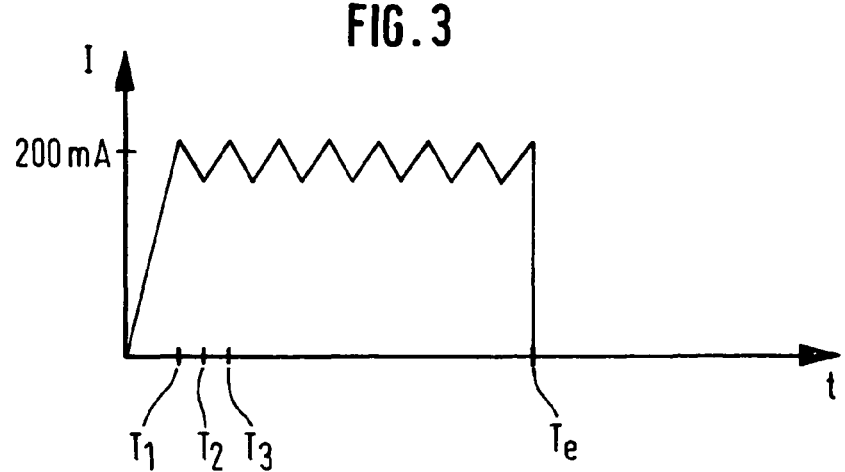
FIGS. 3 and 4 show diagrams indicating the current intensity in the magnet coil when writing HiCo and LoCo magnetic layers, respectively.

For the magnet coil 6 to exert the required magnetic field strength of e.g. 3,000 Oe on the HiCo particles 3 to write a bit 5.1, 5.2 on the magnetic layer 4, the magnet coil 6 must be energized with a current intensity of for example 200±20 mA. As shown in FIG. 3, the current rises to a current intensity of e.g. 210 mA in the time interval $T_1$ when the switch 8 is switched on. When this level is detected by the current measuring device 14, the switch 8 is driven and switched off by the current measuring device 14 via the line 20. Current stored in the coil 6 then decreases to e.g. 190 mA in the interval $T_2$. Then the switch 8 is switched on again in the time interval $T_3$ until the current intensity measured by the current measuring device 14 is 210 mA again. Switching off and on of the switch 8 in the time intervals $T_2$ and $T_3$ is continued until the write operation for the particular bit 5.1 or 5.2 is ended at $T_e$. During the bit write operation the magnetic layer 4 is moved relative to the magnetic head 1 by the transport device of the writing device, according to the arrow X.

Although the current intensity in the coil 6 changes within the stated limits according to the triangular course shown in FIG. 3, a clean read signal is detected upon reading of a magnetic layer written by the inventive apparatus.

Figure 4:
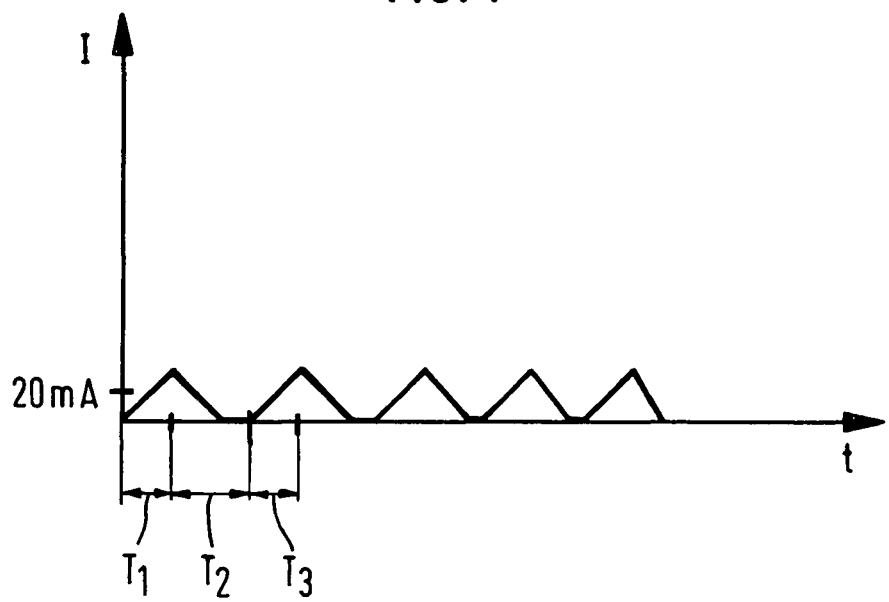

When the LoCo magnetic layer is written according to FIG. 4, the current intensity I drops to zero in the interval $T_2$ after the switch-on interval $T_1$ when the switch 8 is switched off. To prevent insufficient orientation of the magnetic dipoles 3 during this zero phase an appropriately high switching frequency must be guaranteed, whereby it has turned out that a short zero phase of e.g. 2 μs or less does not impair the orientation of the dipoles 3 and thus the read signal.

Figure 5:
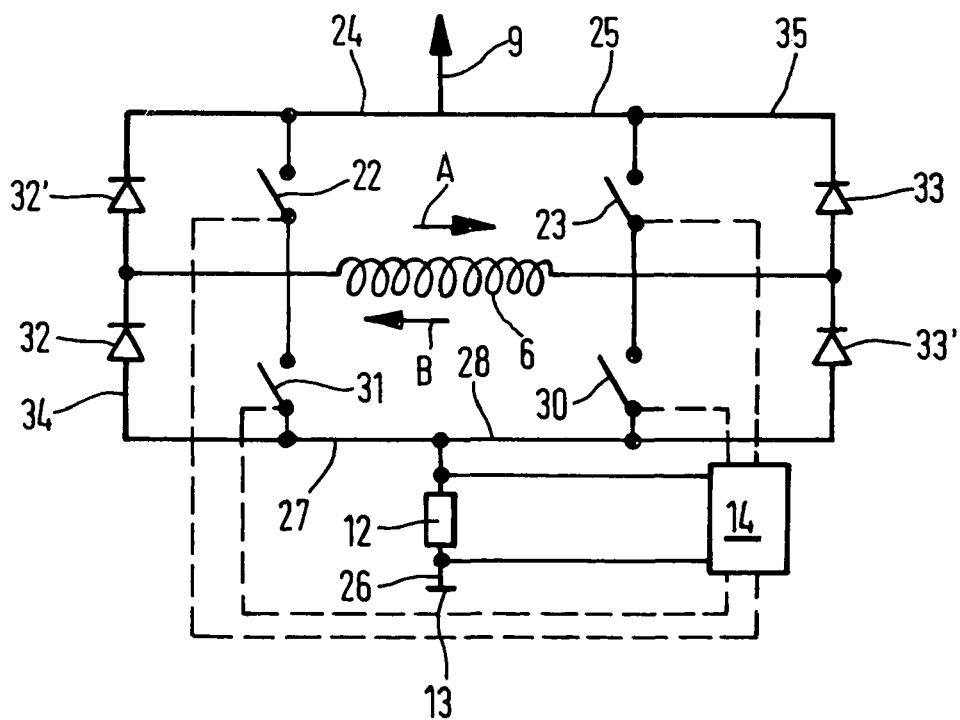
FIG. 5 shows a circuit according to a second embodiment.

To obtain bit locations 5.1 and 5.2 with oppositely oriented dipoles 3 according to FIG. 1 in the magnetic layer 4 by current reversal in one and the other current direction in the magnet coil 6, the circuit shown in FIG. 5 can be used.

Here, two switches 22, 23 are provided for current reversal in the two lines 24, 25 connected to the voltage source 9, being connected to one and the other end of the magnet coil 6 and driven by the current measuring device 14, which is connected on both sides of the resistor 12 to the line 26 which connects the ground 13 to the lines 27, 28 which are connected to one and the other end of the magnet coil 6 and each provided with a switch 30, 31, said switches being provided for, among other things, maintaining the current flow direction when the particular switch 22, 23 is switched off during the interval $T_2$. The switches 30, 31 are likewise driven by the current measuring device 14.

That is, when current flows through the coil 6 e.g. in one direction A for recording the bit 5.1, the second switch 23 is opened during the total bit recording process, while in the interval $T_1$ the first switch 22 and the third switch 30 are closed and the fourth switch 31 open. During the interval $T_2$ the first switch 22 is opened and the fourth switch 31 closed; during the interval $T_3$ the first switch 22 is closed again and the fourth switch 31 opened again, and so on.

To reverse the current in the opposite direction B for recording the next bit 5.2 with oppositely oriented dipoles 3, the first switch 22 is opened during the total bit recording process. During the interval $T_1$ the second switch 23 and the fourth switch 31 are closed and the third switch 30 is opened. During the interval $T_2$ the second switch 23 is opened and the third switch 30, like the fourth switch 31, is closed. In the interval $T_3$ the four switches 22, 23, 30, 31 resume the same position as in the interval $T_1$, and so on.

Further, the circuit according to FIG. 5 includes four diodes 32, 32', 33, 33', the diode 32 being provided in the line 34 bridging the fourth switch 31, while the diode 33 is connected in the line 35, and the line 25 between the switch 23 and the voltage source 9. While the diodes 32 and 33 are connected in parallel with the fourth switch 31 and the second switch 23, respectively, the diodes 32' and 33' are connected in parallel with the first switch 22 and the third switch 30, respectively. The diodes 32, 32', 33, 33' limit the voltage peaks outside the voltage supply levels which can occur after the switches 22, 30 and 23, 31 are switched off. They thus serve only to protect the circuit.

The invention claimed is:

1. An apparatus for writing a magnetic layer writable with either low or high coercive field strength with a magnetic head with a magnet coil and a voltage source, including a first switch between the voltage source and a first end of the magnet coil and a second switch connected to the other, second end of the magnet coil, and a current measuring device for measuring the current intensity through the magnet coil, whereby the current measuring device drives the first switch between the voltage source and the magnet coil in such a way that after the current intensity required for writing the magnetic layer with a bit writable with low coercive field strength or high coercive field strength is reached in the magnet coil, the first switch is switched off and on, and the second switch remains switched off during the writing of a bit so that the current intensity through the magnet coil does not exceed or undershoot a level required for writing.

2. The apparatus according to claim 1, wherein a resistor is provided in the current path for the current measuring device, the current measuring device determining current intensity through the magnet coil from voltage measured across the resistor.

3. The apparatus according to claim 2, including a third switch provided between the resistor and the second end of the magnet coil, and a fourth switch provided between the resistor and the first end of the magnet coil, the third and fourth switches being controlled by the current measuring device, whereby after a first time period $T_1$ with the first switch switched on and the third switch switched on, for a second time period $T_2$ the first switch is switched off and the fourth switch is switched on; the time periods $T_1$, $T_2$ alternating in response to the current intensity required for writing to prevent the current intensity through the magnet coil from exceeding or undershooting the current intensity level required for writing.

4. The apparatus according to claim 3, wherein the first, second, third and fourth switches comprise electronic switches.

5. The apparatus according to claim 1, the apparatus including first and second diodes electrically connected in parallel with the respective first and second switches to limit voltage peaks from occurring after the switches are switched off.

6. An apparatus for writing data onto a magnetic layer having either low or high coercive field strength comprising:
a magnetic head with a magnetic coil;
a voltage source;
a first switch connecting the voltage source to a first end of the magnetic coil;
a second switch connecting the voltage source to a second end of the magnetic coil; and
a current measuring device provided in a ground path for both of the first and second ends of the magnetic coil, the current measuring device configured to measure current intensity through the magnetic coil and configured for controlling operation of the first and the second switches;
wherein the current measuring device operates so that the magnetic coil is subjected to the required current intensity in a first direction from the first end of the magnetic coil to the second end of the magnetic coil for writing a bit, the current measuring device switching the first switch on and off in response to the measured current intensity and maintaining the second switch off during the writing of a bit, the switching ensuring that the current intensity through the magnetic coil does not exceed or undershoot a level required for writing a bit.

7. The apparatus according to claim 6, further comprising:
a third switch connecting the second end of the magnetic coil to the current measuring device; and
a fourth switch connecting the first end of the magnetic coil to the current measuring device.

8. The apparatus according to claim 7, wherein the current measuring device includes a resistor having a first end electrically connected to the first end of the magnetic coil through the fourth switch, and the resistor having the first end electrically connected to the second end of the magnetic coil through the third switch.

9. The apparatus according to claim 8, wherein the current measuring device senses the voltage across the resistor to measure the current intensity through the magnetic coil.

10. The apparatus according to claim 9, further comprising four diodes electrically connected in parallel with respective ones of said first through said fourth switches for limiting voltage peaks when the switches are switched off.

11. The apparatus according to claim 7, wherein the current measuring device is configured to close the third switch when the first switch is closed to provide a current path in the first direction through the magnetic coil.

12. The apparatus according to claim 11, wherein the current measuring device is configured to close the fourth switch when the first switch opens to provide a current path through the magnetic coil in a second direction from the first direction.

13. The apparatus according to claim 7, wherein for providing a second bit on a magnetic layer with oppositely oriented dipoles, the current measuring device is configured to maintain the first switch off and to close the second and fourth switches to provide the required current intensity through the magnetic coil in a second direction from the first direction, the current intensity passing from the second end of the magnetic coil through the first end of the magnetic coil to form a second bit with an opposite orientation on a magnetic layer from a first bit, wherein the current measuring device operates so that the second switch is periodically turned off and on so that the current intensity through the magnetic coil in the second direction does not exceed or undershoot a level required for writing a second bit with oppositely oriented dipoles.

14. An apparatus for writing data onto a magnetic layer having either low or high coercive field strength comprising:
a magnetic head with a magnetic coil;
a voltage source;
a first switch connecting the voltage source to a first end of the magnetic coil;
a device for maintaining the direction of current intensity through the magnetic coil; and
a current measuring device including a resistor directly connected to the second end of the magnetic coil and to ground, the resistor providing the only current path from the second end of the magnetic coil to ground, the current measuring device configured to measure current intensity through the magnetic coil from the voltage measured across the resistor and configured to control operation of the first switch so that a level of the current intensity through the magnetic coil does not exceed or undershoot a level required for writing a bit onto a magnetic layer.

15. The apparatus according to claim 14, wherein the device comprises a second switch connecting the first end of the magnetic coil to ground, and wherein the current measuring device is configured to switch the first switch off and the second switch on to prevent the measured current intensity through the magnetic coil from exceeding a level necessary for writing a bit.

16. The apparatus of claim 14, wherein the resistor has a resistance of less than 2 ohms.

17. The apparatus of claim 14, wherein the device for maintaining the direction of current intensity through the magnetic coil comprises a rectifier connected between the first end of the magnetic coil and ground.

* * * * *